(12) United States Patent
Floyd et al.

(10) Patent No.: US 6,529,979 B1
(45) Date of Patent: Mar. 4, 2003

(54) METHOD AND APPARATUS FOR A HIGH-SPEED SERIAL COMMUNICATIONS BUS PROTOCOL WITH POSITIVE ACKNOWLEDGEMENT

(75) Inventors: Michael Stephen Floyd, Leander, TX (US); Larry Scott Leitner, Austin, TX (US); Kevin Franklin Reick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,105

(22) Filed: Nov. 8, 1999

(51) Int. Cl.[7] ............................................... G06F 13/14
(52) U.S. Cl. ...................................... 710/105; 710/113
(58) Field of Search ........................... 710/105, 37, 113; 714/748; 340/825.52

(56) References Cited

U.S. PATENT DOCUMENTS

| | | | |
|---|---|---|---|
| 5,335,233 A | * | 8/1994 | Nagy .......................... 714/748 |
| 5,793,993 A | * | 8/1998 | Broedner et al. ......... 340/825.52 |
| 5,948,080 A | * | 9/1999 | Baker .................... 340/825.51 |

* cited by examiner

Primary Examiner—Peter Wong
Assistant Examiner—Justin King
(74) Attorney, Agent, or Firm—Duke W. Yee; Volel Emile; Lisa L. B. Yociss

(57) ABSTRACT

A method and apparatus for transferring data using an on-chip bus is presented. A data transaction consisting of an address and data packet is transmitted on an on-chip bus which is a two-wire serial bus consisting of an address line and a data line that connects a plurality of satellites in a daisy-chain fashion to a central source. Each on-chip satellite is associated with a unique identifier. In response to a determination that the transaction is accepted by the satellite, which is determined by the address in the address packet positively comparing to a unique identifier for the satellite, the address packet is modified to provide a positive acknowledgment of a receipt of the address packet back to the central source of the transaction. The address packet is modified by clearing the stop bit of the address packet, i.e. gating off or negating the stop bit. Alternatively, the address packet is otherwise modified to indicate the acceptance of the packet. The source of the address packet will identify that the operation was successful by detecting that the stop bit is cleared from the framed address packet, thereby receiving the positive acknowledgment indication, thus indicating that a successful transaction occurred.

20 Claims, 5 Drawing Sheets

TO FIG. 3B

METHOD AND APPARATUS FOR A HIGH-SPEED SERIAL COMMUNICATIONS BUS PROTOCOL WITH POSITIVE ACKNOWLEDGEMENT

BACKGROUND OF THE INVENTION

1. Technical Field

The present invention relates generally to an improved data processing system. More particularly, the present invention relates to a method and apparatus for processing control of on-chip data transfers.

2. Description of Related Art

As fabrication techniques for digital logic circuitry continue to improve, chip designers increasingly place more data processing components and logical functions on-chip. As more functionality is placed on-chip, the need for configuring modes of operation for the chip and for checking the status of the chip for the new functionality also increases. Hence, chip designers also desire increasing amounts of mode configuration and status monitoring functionality on the chip.

The placement of all of this functionality on the chip leads to contention for physical resources, which is a major concern while designing chips. Each component requires a certain amount of power that results in heat that must be dissipated. In addition, each component requires a certain amount of physical space. As the ability to shrink circuitry increases, thereby creating more physical space for more components on-chip, the number of components that a designer desires to place on-chip may quickly subsume the physical space required for the placement of those components.

Many processors are now available in which a processor has the ability for its system clock to be stopped so that special on-chip test circuitry may be activated. Under the control of a test clock, the test circuitry reads and writes scan latches and registers throughout the chip. As one example, one of these registers may be internal to an instruction execution unit in the processor. The data is scanned out so that an examination may be made of the contents of the internal register at the time that the processor clock was stopped. A different value may then be written into the register and the processor clock restarted. In this manner, a development engineer may test and debug the hardware design of the processor circuitry.

There is often a need to set mode registers or especially to check status registers while the chip is functionally running without stopping system clocks and performing test clock operations. Additionally, for some designs, stopping system clocks causes the chip to be non-restartable without a full power-on-reset of the system because stopping system clocks may perturb the synchronization of the chips in the system.

In other known designs, many of the configurable mode bits must be brought out as pins on the chip module and configured on the system planar. As computer chips become more complex, there is an increasing number of mode bits requiring too many pins. Often, the pins are hardwired on the system planar and not usually software configurable. An alternate solution to mode pins is to use configuration registers on the chip, but similarly, as the chips become more complex, this large number of configuration wires cannot be feasible sourced by a single on-chip unit but instead needs to be distributed throughout the system.

Therefore, it would be advantageous to have an improved communication system and protocol for dedicated configuration and test circuitry that minimizes the amount of dedicated circuitry and wire congestion.

SUMMARY OF THE INVENTION

A method and apparatus for transferring data using an on-chip bus is presented. A data transaction consisting of an address and data packet is transmitted on an on-chip bus which is a two-wire serial bus consisting of an address line and a data line that connects a plurality of satellites in a daisy-chain fashion to a central source. Each on-chip satellite is associated with a unique identifier. In response to a determination that the transaction is accepted by the satellite, which is determined by the address in the address packet positively comparing to a unique identifier for the satellite, the address packet is modified to provide a positive acknowledgment of a receipt of the address packet back to the central source of the transaction. The address packet is modified by clearing the stop bit of the address packet, i.e. gating off or negating the stop bit. Alternatively, the address packet is otherwise modified to indicate the acceptance of the packet. The source of the address packet will identify that the operation was successful by detecting that the stop bit is cleared from the framed address packet, thereby receiving the positive acknowledgment indication, thus indicating that a successful transaction occurred.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
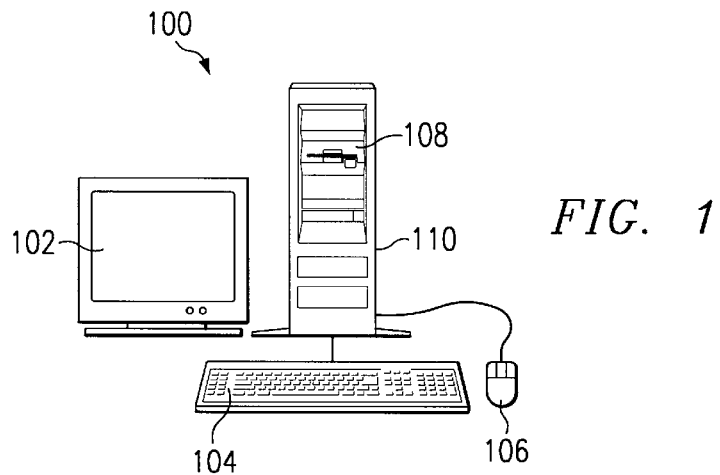
FIG. 1 is a pictorial representation depicting a data processing system in which the present invention may be implemented.

With reference now to FIG. 1, a pictorial representation depicts a data processing system in which the present invention may be implemented. A computer 100 is depicted, which includes a system unit 110, a video display terminal 102, a keyboard 104, storage devices 108, which may include floppy drives and other types of permanent and removable storage media, and mouse 106. Additional input devices may be included with computer 100. Computer 100 can be implemented using any suitable computer, for example, an IBM RISC/System 6000 system, a product of International Business Machines Corporation in Armonk, N.Y., running the Advanced Interactive Executive (AIX) operating system, also a product of IBM. Although the depicted representation shows a server-type computer, other embodiments of the present invention may be implemented in other types of data processing systems, such as workstations, network computers, Web-based television set-top boxes, Internet appliances, etc. Computer 100 also preferably includes a graphical user interface that may be implemented by means of system software residing in computer readable media in operation within computer 100.

FIG. 1 is intended as an example and not as an architectural limitation for the present invention.

Figure 2:
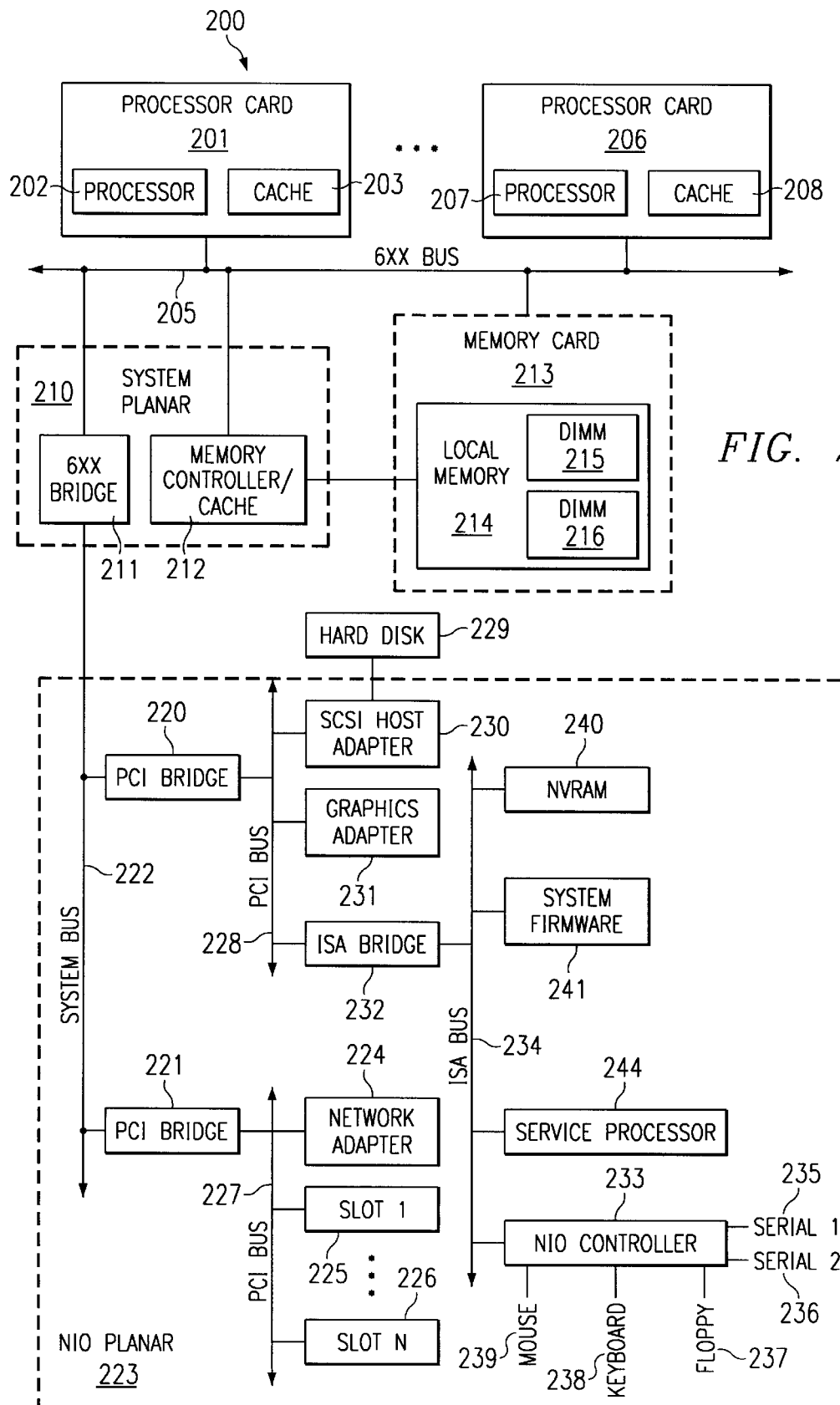
FIG. 2 is an example block diagram illustrating internal components of a server-type data processing system that may implement the present invention.

With reference now to FIG. 2, a block diagram depicts a typical organization of internal components in a data processing system. Data processing system 200 employs a variety of bus structures and protocols. Although the depicted example employs a PCI bus, an ISA bus, and a 6XX bus, other bus architectures and protocols may be used.

Processor card 201 contains processor 202 and L2 cache 203 that are connected to 6XX bus 205. System 200 may contain a plurality of processor cards. Processor card 206 contains processor 207 and L2 cache 208.

6XX bus 205 supports system planar 210 that contains 6XX bridge 211 and memory controller 212 that supports memory card 213. Memory card 213 contains local memory 214 consisting of a plurality of dual in-line memory modules (DIMMs) 215 and 216.

6XX bridge 211 connects to PCI bridges 220 and 221 via system bus 222. PCI bridges 220 and 221 are contained on native I/O (NIO) planar 223 which supports a variety of I/O components and interfaces. PCI bridge 221 provides connections for external data streams through network adapter 224 and a number of card slots 225–226 via PCI bus 227. PCI bridge 220 connects a variety of I/O devices via PCI bus 228. Hard disk 229 may be connected to SCSI host adapter 230, which is connected to PCI bus 228. Graphics adapter 231 may also be connected to PCI bus 228 as depicted, either directly or indirectly.

ISA bridge 232 connects to PCI bridge 220 via PCI bus 228. ISA bridge 232 provides interconnection capabilities through NIO controller 233 via ISA bus 234, such as serial connections 235 and 236. Floppy drive connection 237 provides removable storage. Keyboard connection 238 and mouse connection 239 allow data processing system 200 to accept input data from a user. Non-volatile RAM (NVRAM) 240 provides non-volatile memory for preserving certain types of data from system disruptions or system failures, such as power supply problems. System firmware 241 is also connected to ISA bus 234 and controls the initial BIOS. Service processor 244 is connected to ISA bus 234 and provides functionality for system diagnostics or system servicing.

Service processor 244 detects errors and passes information to the operating system. The source of the errors may or may not be known to a reasonable certainty at the time that the error is detected. The operating system may merely log the errors or may otherwise process reported errors.

Those of ordinary skill in the art will appreciate that the hardware in FIG. 2 may vary depending on the system implementation. For example, the system may have more processors, and other peripheral devices may be used in addition to or in place of the hardware depicted in FIG. 2. The depicted examples are not meant to imply architectural limitations with respect to the present invention.

With reference now to FIG. 3, a block diagram depicts the layout of a two-wire serial bus and various control units that provide the functionality of a positive acknowledgment in accordance with a preferred embodiment of the present invention. FIG. 3 shows circuit 300 with a two-wire or two-line serial bus (TLSB) that may be daisy-chained through hundreds of serial bus interface units, called satellites, on a chip. The TLSB bus provides an efficient mechanism for reading and writing to the satellites on the chip for configuration, testing, and monitoring purposes, as explained in more detail below.

TLSB Parallel-to-Serial Converter (PSC) 350 is a TLSB master than controls access to the TLSB, which is a two-wire serial bus that daisy-chains through satellites 311–313. TLSB PSC 350 is located on the VLSI chip. The service processor may communicate with TLSB PSC 350 through a JTAG interface on the chip.

Additionally, TLSB PSC 350 may be located on a chip with multiple processor cores. A processor core may contain functionality similar to a central processing unit, and multiple processor cores are located on a single chip may share certain resources, such as on-chip caches, etc. In this configuration, a processor core may communicate with TLSB PSC 350 through an interface, such as shown in FIG. 3, where a processor core may act as a TLSB master 330 or 332. Commands may be given to TLSB PSC 350 through instructions executing on that processor core using special purpose registers dedicated for holding parallel data for placement on the serial interface. Software or firmware may read and write to these registers to cause commands to the sent to TLSB PSC 350. These same registers may then be read to discover TLSB communication errors. For example, the service processor could be notified of a positive acknowledgment error generated by a communication error on the TLSB, and the service processor may then read a register TLSB 350 to identify the type of error, etc. The generation of a positive acknowledgment error in accordance with a preferred embodiment of the present invention is provided in more detail further below.

As shown in the figure, satellites 311–313 are located throughout the VLSI chip including the processor cores. The number of supportable satellites depends on the system implementation, the amount of area of the chips connected to the TLSB dedicated to its functionality, and the functionality that is desired by the chip developers. Satellites 311–313 contain TLSB Data Units 314–316 and TLSB Address Units 317–319. A TLSB Data Unit within a satellite provides serial-to-parallel conversion of a data packet received from the TLSB and parallel-to-serial conversion of a data packet to be placed on the TLSB. A TLSB Address Unit within a satellite provides serial-to-parallel conversion of an address packet received from the TLSB and are responsible for implementing positive acknowledgment functionality.

The TLSB comprises a data line and an address line. The data line is shown as TLSB_Data_Out 322 output from TLSB PSC 350, daisy-chained through the satellites, and input back into TLSB PSC 350 as TLSB_Data_In 324. The address line is shown as TLSB_Addr_Out 326 and daisy-chained through the satellites, and input back into TLSB PSC 350 as TLSB_Addr_In 328.

The TLSB is tapped by TLSB masters 330 and 332. The TLSB is a resource that is available to a variety of components. Several data sources may be connected to the TLSB, and if so, an arbiter may be used to arbitrate for access to the TLSB. The arbiter may be located internally or externally to TLSB PSC 350. One or more of the masters may be driven by the service processor or may be under the control of software.

Masters 330 and 332 receive one-bit-wide serial inputs of address and data information from the TLSB via TLSB_Addr_In 328 and TLSB_Data_In 322. Masters 330 and 332 would contain a serial-to-parallel converter (not shown) to convert the data that is received serial into parallel format. Masters 330 and 332 receive a TLSB grant, such as grants 333 and 334, from TLSB PSC 350 that provide an indication that a master may start transferring data. Masters 330–332 output data packets on Data_Outs 335 and 336 address packets on Address_Outs 337 and 338 onto Data Bus 340 and Address Bus 341, which is then input into TLSB PSC 350.

TLSB PSC 350 receives the inputs as Data_Out 342 and Address_Out 344, respectively. In the example, the widths correspond to the size of the data and address packets to be placed on the TLSB, is 64 bits and 16 bits plus a read/write bit, respectively. The width of these lines may vary depending upon system implementation.

Alternatively, the masters may communicate with the TLSB PSC via a similar two-wire serial bus with similar parallel-to-serial conversion or serial-to-parallel conversion functionality, respectively.

The names of these inputs, Data Out 342 and Address_Out 344, should be viewed from the perspective of the masters as the direction of data is towards the satellites. In other words, the data and address received by TLSB PSC 350 will be converted from parallel format to serial format and output to the satellites. The satellites may receive data and then place data onto the TLSB, which is then fed back to TLSB PSC 350 as TLSB_Data_In 324 and TLSB_Addr_In 328, i.e., from the perspective of the masters, the direction of data is towards the masters.

TLSB PSC 350 also contains central control unit 352 for providing various control signals to the TLSB masters or for control signals within TLSB PSC 350. TLSB PSC 350 contains Data Serial Control Unit 354 that is used to place data packets onto the TLSB and Serial-to-Parallel Data Converter 356 that is used to receive incoming data packets from the TLSB. Although masters 330 and 332 have also received these data packets via the TLSB, these packets may be optionally provided to other components through a parallel interface for a variety of purposes if desired.

TLSB PSC 350 contains Address Serial Control Unit 358 that is used to place address packets onto the TLSB and Address Receipt Register 360 that is used to receive incoming address packets from the TLSB. Although masters 330 and 332 have also received these address packets via the TLSB, these packets may be optionally provided to other components through a parallel interface for a variety of purposes if desired.

TLSB PSC 350 receives address packets through TLSB_Addr_In 328, places the incoming address packet into Address Receipt Register 360, and determines whether there is a positive acknowledgment error. If so, then PosAckFailed signal 364 is generated, and the signal may be processed appropriately, such as by sending the error signal to the service processor. The manner in which the positive acknowledgment may be better understood in conjunction with the discussion below concerning the format of the address packet and the manner in which the satellites process the stop bit in an address packet. The start bit of the address packet demarcates the beginning of the address packet, which is fed as an input into AND gate 363, thereby providing a manner of selecting the AND gate. The complement of the stop bit from the address packet is also fed as an input into AND gate 363. Since the stop bit should have been stripped off by a satellite to acknowledge the receipt of the address packet, a logical "1" for a stop bit causes AND gate 363 in conjunction with a start bit of "1" to generate PosAckFailed signal 364.

Comparator 362 compares the address from the outgoing address packet as placed on the TLSB and the address from the incoming packet as received from the TLSB. The result of the comparison of the address packets is also fed into AND gate 365. The start bit demarcates the beginning of the address packet, which is fed as an input into AND gate 365, thereby providing a manner of selecting the AND gate. If the address has been corrupted, then AddressCorrupted signal 366 may be generated and processed in the appropriate manner.

Figure 4A:
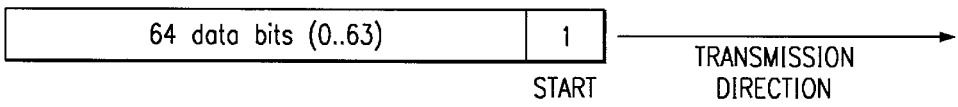
FIGS. 4A–4B depict the format of a data packet and address packet that may be used to communicate information on a two-wire serial bus such that positive acknowledgment may be generated by various control units in accordance with a preferred embodiment of the present invention.
Figure 4B:
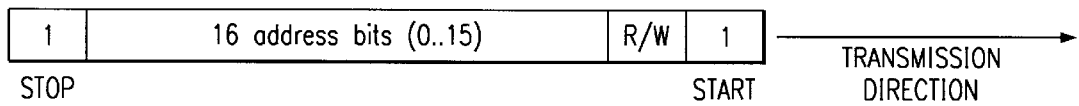

With reference now to FIGS. 4A–4B, diagrams depict the format of a data packet and address packet that may be used to communicate information on a two-wire serial bus such that positive acknowledgment may be generated by various control units in accordance with a preferred embodiment of the present invention.

As explained with respect to FIG. 3 above, the TLSB is a two-wire serial bus that daisy-chains through TLSB satellites, which contain serial-to-parallel converters, thereby providing two serial inputs to the serial-to-parallel converters. Data is transmitted on these serial lines in groups of bits referred to as packets. Address packets come in on a TLSB address input and data packets are received on a TLSB data input.

The serial-to-parallel converters are designed with several underlying assumptions:

1. The data packet will consist of 65 bits, consisting of a start bit and 64 data bits (LSB first), as shown in FIG. 4A.
2. The address packet will consist of 19 bits, consisting of a start bit, a read/write bit, 16 address bits (LSB first), and a stop bit, as shown in FIG. 4B. Framing the packet with start and stop bits allows constant shifting of the address shift register at a satellite unit 317–319.
3. The address packet contains a read/write bit: "1" indicates a read request and "0" signifies a write operation.
4. The data packet will be received by the satellites at least two cycles after the end of the address packet (at least two dead cycles between packets).
5. All serial lines have zeroes driven onto them when no packets are being transmitted.
6. The serial-to-parallel converters always latch and forward the serial address and data to the next converter in the chain regardless of address match.
7. An address packet will not be sent on the serial interface until any outstanding data packet has been completely sent by the serial-to-parallel converter from the previous transaction, i.e. received by the parallel-to-serial converter. In other words, referring again to FIG. 3, the next address packet will not be sent by TLSB PSC 350 until the previous data packet is received by the TLSB PSC. This will remove the possibility of subsequent TLSB accesses, i.e. address packet transmissions, conflicting with data transmissions in progress by the serial to parallel converter, i.e. during TLSB reads. This also ensures that there will be at least an address packet-sized gap between address packet transmissions, which is necessary to prevent false address triggers.

For simplicity, the serial-to-parallel converters rely on a transmission protocol that uses start bits for incoming packets. The address shift register, e.g., as would be present in TLSB Address Unit 317 in FIG. 3, constantly shifts, and the data shift register, e.g., as would be present in TLSB Data Unit 314 in FIG. 3, by default holds until there is an address match. Thus, the address shift register also needs a stop bit to indicate when to perform the address compare. When looking for a packet, the shift register constantly shifts until triggered, which would be caused in the address shift register by the start and stop bits both equal to "1" and caused in the data shift register by start bit equal to "1", at which time some action is initiated. When the address shift register triggers, the address is checked for a match with the satellite's TLSB ID, explained in more detail further below. For a TLSB Write, an address match initiates the data shift register to shift until triggered, at which time the contents are parallel-loaded into the data register. For a TLSB Read, an address match causes the data register to be parallel-loaded into the data Shifter and the data shifter to then begin shifting, which stops upon seeing an address start bit for the next transaction.

Figure 5:
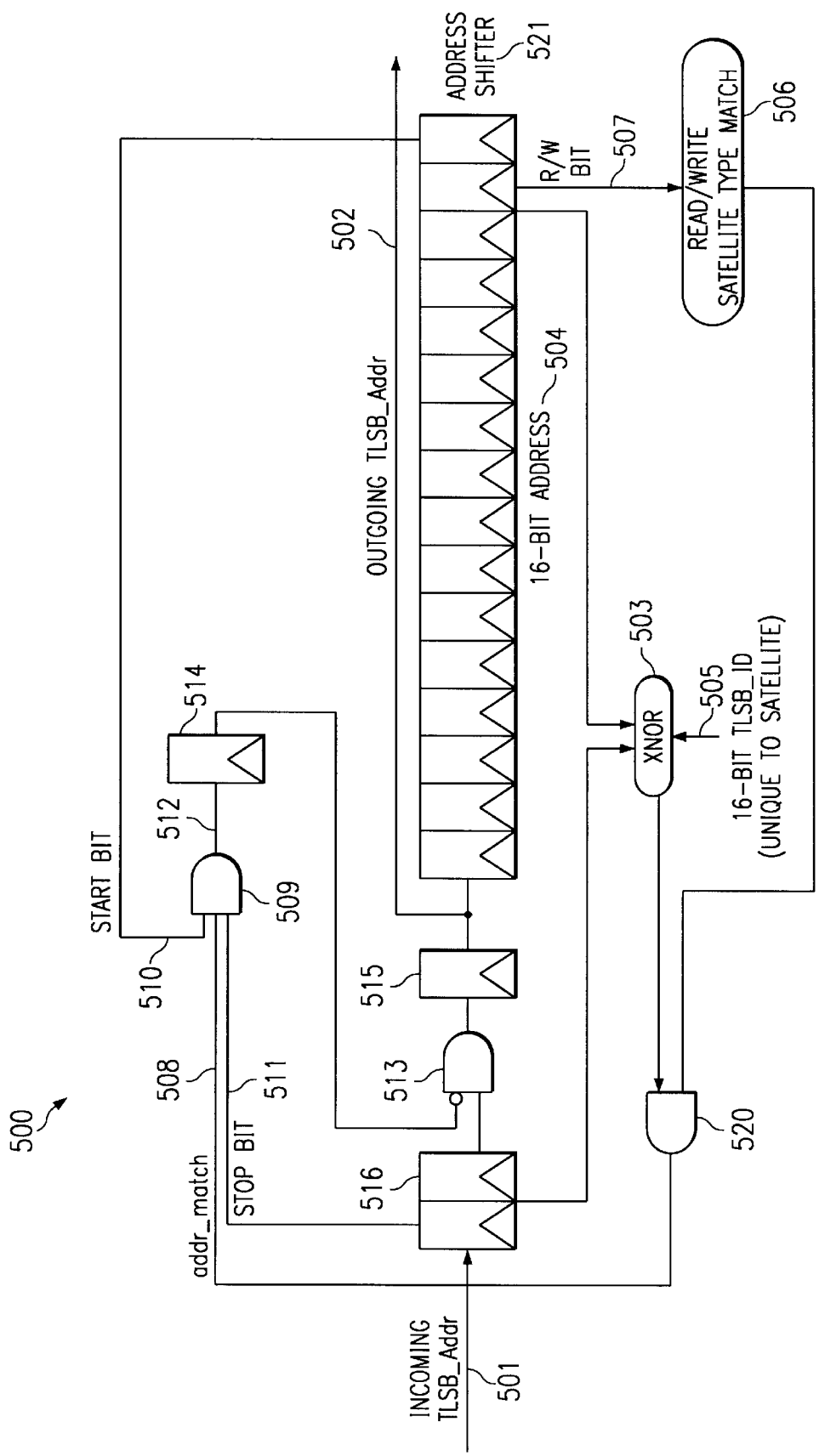
FIG. 5 is a logic circuit that generates positive acknowledgment using an address packet on a two-wire serial bus in accordance with a preferred embodiment of the present invention.

With reference now to FIG. 5, a diagram depicts a logic circuit that generates positive acknowledgment using an address packet on a two-wire serial bus in accordance with a preferred embodiment of the present invention.

Each serial-to-parallel converter is assigned a unique 16-bit TLSB_ID used to match against the incoming TLSB address. All converters latch the incoming TLSB_Addr and TLSB_Data bits and re-send them unchanged, except for the address stop bit which is used for positive acknowledgment as explained below, three cycles later on the outgoing TLSB_Addr and TLSB_Data lines. This allows TLSB blocks in close proximity to be chained together by connecting the outgoing TLSB_Addr line of the first block to the incoming TLSB_Addr line of the next block. Similarly, the TLSB_Data lines may be chained together in the same fashion. The converters form a chain that loops back to the unit providing access to the TLSB, such as TLSB PSC 350 in FIG. 3.

An address packet is received by converter 500 and enters address shifter 521 on TLSB_Addr line 501, and the address packet is shifted out on TLSB_Addr line 502. When a converter has an address match, as provided by XNOR comparator 503 comparing 16-bit address 504 and the converter's or satellite's TLSB_ID 505, it gates off the stop bit from the address packet as it forwards it to the next converter in the chain. Since all converters have a unique address, it is the only converter that will match; all of the other converters, after they receive the address packet, will not match on that particular address packet. Even if there were some type of hardware or design error causing these converters to think that they had the same address, the cleared stop bit would prevent subsequent satellites from seeing a framed packet.

For a write operation, after address match 508 occurs, the next incoming data packet from the data serial bus will be captured. In the case of a read operation, the address match 508 causes a data packet to be generated by the satellite using the contents of its data register. A variety of means may be used to sequence the capturing the data on a write or the generation and sending of data on a read, such as a state machine or a data flow circuit depending upon system implementation.

The stop bit is gated off, i.e. set to zero, in the following manner. Read/Write satellite match unit 506 qualifies the address match such that read-only, write-only, and read/write satellites can be created. If one attempts to perform a write to a read-only address, the converter will not match due the output of read/write satellite-type match unit 506 blocking an address compare at AND gate 520. The TLSB_ID matches the unique TLSB identifier, as determined by XNOR 503, AND gate 520 generates addr_match signal 508 is provided to AND gate 509. If the complete address packet has been received, as determined by start bit 510 and stop bit 511 properly framing the address packet, AND gate 509 provides output 512 of "1", indicating that the address packet was completely and properly received. Output 512 is then negated by AND gate 513 to "strip out" the stop bit, thereby providing a positive acknowledgment indication. Latch 514 provides a one-cycle delay to ensure that output 512 is input into latch 515 on the cycle when the output of latch 516 would normally be input into latch 515.

Referring again to FIG. 3, TLSB PSC 350 can then check the address packet that returns from the loop with the packet it sent out on the chain by using comparator 362 and AND gates 363 and 365. The address plus R/W fields, starting with the start bit, should exactly match what was originally transmitted. If not, some form of hardware corruption occurred. Positive acknowledgment, indicating that the transaction was successful, occurs when the same address packet is returned with the stop bit missing. If the stop bit is still present in the address packet, it indicates that the transaction was unrecognized and therefore unsuccessful. This usually indicates a software error where the TLSB user code tried an invalid address. It could also indicate a hardware error in the target converter that caused it not to recognize its address.

Alternatively, the address packet may be modified in a variety of different manners to provide an indication of a positive acknowledgment, such as modifying other bits, adding other bits, or otherwise modifying the format of the address packet on the return path to the originator of the address packet.

The advantages of the present invention should be apparent in view of the detailed description provided above. The serial communications protocol allows a processor to read and write data through special ports, such as a JTAG port, while the system clock is running. Special functionality may be implemented on the serial bus for configuring modes of operation, for initiating special behavior, and for checking the status of the microprocessor dynamically in real-time without interrupting the computer system. Using a parallel-only interface to every accessible configuration register causes significant wiring congestion. The present invention also provides the ability of a packet originator, such as the serial bus master, to receive a positive acknowledgment that indicates that a data transfer was successful. If a positive acknowledgment is not received, then a hardware error or software error may have occurred, and an error is generated. Further reconfiguration or diagnostics may then be performed, if necessary, to allow processing to continue or to determine the cause of the error.

It is important to note that while the present invention has been described in the context of a fully functioning data processing system, those of ordinary skill in the art will appreciate that the processes of the present invention are capable of being distributed in the form of a computer readable medium of instructions, including microcode, and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for transferring data using a serial bus within a semiconductor substrate, the apparatus comprising:
   a microprocessor within said semiconductor substrate including a plurality of serial bus interface units;
   said serial bus having an address line and a data line, said serial bus being within said semiconductor substrate and coupled to said plurality of serial bus interface units;
   each one of said plurality of serial bus interface units being located within said semiconductor substrate and being identifiable by a unique address, wherein each one of said plurality of serial bus interface units includes a two-wire serial bus data unit and a two-wire serial bus address unit, wherein the two-wire serial bus address unit is connected to the address line, the two-wire serial bus data unit is connected to the data line, and wherein the two-wire serial address unit further includes:
   an address shift register for serially inputting and serially outputting an address packet on the address line;
   an address comparator for comparing an address from an address packet received on the address line to the unique address; and
   a positive acknowledgment generation unit for modifying the address packet to provide a positive acknowledgment of a receipt of the address packet to a source of the address packet.

2. The apparatus of claim 1, wherein the address packet is modified for positive acknowledgment by clearing the stop bit.

3. The apparatus of claim 1, wherein the positive acknowledgment generation unit further comprises:
   an address packet framing unit for determining whether the address packet is properly framed, wherein the address packet framing unit accepts a start bit, a stop bit, and an address match signal, and wherein the address packet framing unit generates a positive acknowledgment signal; and
   an address packet modification unit for modifying the address packet to indicate a positive acknowledgment to the source of the address packet in response to the positive acknowledgment signal from the address packet framing unit.

4. The apparatus of claim 1, wherein each of said plurality of serial bus interface units are connected by the two-wire serial bus in a daisy-chain fashion.

5. The apparatus of claim 1, wherein the two-wire serial address unit further comprises:
   a read-write type match unit for matching a read-write bit in the address packet with a read-write type for each one of said plurality of serial bus interface units; and
   a blocking unit for blocking a successful address comparison from being used in the positive acknowledgment unit in response to the read-write type match unit failing to match the read-write type for each one of said plurality of serial bus interface units.

6. The apparatus according to claim 1, further comprising:
   a plurality of processor cores included in said microprocessor;
   each one of said plurality of processor cores including one of said plurality of serial bus interface units;
   a cache located on said semiconductor substrate; and
   said cache including one of said plurality of serial bus interface units.

7. The apparatus according to claim 1, further comprising:
   a service processor that is separate and apart from said microprocessor; and
   said service processor for checking a status of said microprocessor using said serial bus.

8. The apparatus according to claim 7, further comprising:
   said serial bus capable of being utilized by said service processor to read data from and write data to said semiconductor substrate while a system clock included in said apparatus is running.

9. A method for transferring data using a serial bus within a semiconductor substrate, the method comprising the steps of:
   providing a microprocessor within said semiconductor substrate including a plurality of serial bus interface units;
   coupling said plurality of serial bus interface units together using said bus which is a two-wire internal serial bus, said bus being within said semiconductor substrate and coupled to said plurality of serial bus interface units;
   receiving an address packet at one of said plurality of serial bus interface units, wherein the bus includes an address line and a data line that connects said plurality of serial bus interface units in a daisy-chain fashion, and wherein each one of said plurality of serial bus interface units is associated with a unique identifier; and
   in response to a determination that an address in the address packet positively compares to a unique identifier for one of said plurality of serial bus interface units, modifying the address packet to provide a positive acknowledgment of a receipt within said one of said plurality of serial bus interface units of the address packet to a source of the address packet.

10. The method of claim 9 further comprising:
    clearing the stop bit in order to modify the address packet to provide a positive acknowledgment to the source of the address packet.

11. The method of claim 9 further comprising:
    verifying a proper address packet frame.

12. The method of claim 10 further comprising:
    determining whether the address packet contains a start bit; and
    determining whether the address packet contains a stop bit.

13. An apparatus for transferring data using a serial bus within a semiconductor substrate, the apparatus comprising:
    a microprocessor within said semiconductor substrate including a plurality of serial bus interface units;
    receiving means for receiving an address packet at one of said plurality of serial bus interface units, wherein the bus is a two-wire internal serial bus being within said semiconductor substrate and including an address line and a data line that connects said plurality of serial bus interface units in a daisy-chain fashion, and wherein each one of said plurality of serial bus interface units is associated with a unique identifier;

modifying means for modifying, in response to a determination that an address in the address packet positively compares to a unique identifier for one of said plurality of serial bus interface units, the address packet to provide a positive acknowledgment of a receipt within said one of said plurality of serial bus interface units of the address packet to a source of the address packet.

14. The apparatus of claim 13 further comprising:

clearing means for clearing the stop bit in order to modify the address packet to provide a positive acknowledgment to the source of the address packet.

15. The apparatus of claim 13 further comprising:

verifying means for verifying a proper address packet frame.

16. The apparatus of claim 15 further comprising:

first determining means for determining whether the address packet contains a start bit; and second determining means for determining whether the address packet contains a stop bit.

17. A computer program product in a computer-readable medium for use in a data processing system for transferring data using a serial bus within a semiconductor substrate, the computer program product comprising:

instructions for receiving an address packet at one of a plurality of serial bus interface units, said microprocessor within said semiconductor substrate including a plurality of serial bus interface units, wherein the bus is a two-wire internal serial bus being within said semiconductor substrate and including an address line and a data line that connects said plurality of serial bus interface units in a daisy-chain fashion, and wherein each one of said plurality of serial bus interface units is associated with a unique identifier;

instructions for modifying, in response to a determination that an address in the address packet positively compares to a unique identifier for one of said plurality of serial bus interface units, the address packet to provide a positive acknowledgment of a receipt within said one of said plurality of serial bus interface units of the address packet to a source of the address packet.

18. The computer program product of claim 17 further comprising:

instructions for clearing the stop bit in order to modify the address packet to provide a positive acknowledgment to the source of the address packet.

19. The computer program product of claim 17 further comprising:

instructions for verifying a proper address packet frame.

20. The method of claim 18 further comprising:

instructions for determining whether the address packet contains a start bit; and instructions for determining whether the address packet contains a stop bit.

* * * * *

UNITED STATES PATENT AND TRADEMARK OFFICE
CERTIFICATE OF CORRECTION

PATENT NO. : 6,529,979 B1 Page 1 of 1
DATED : March 4, 2003
INVENTOR(S) : Floyd et al.

Figure 3A:
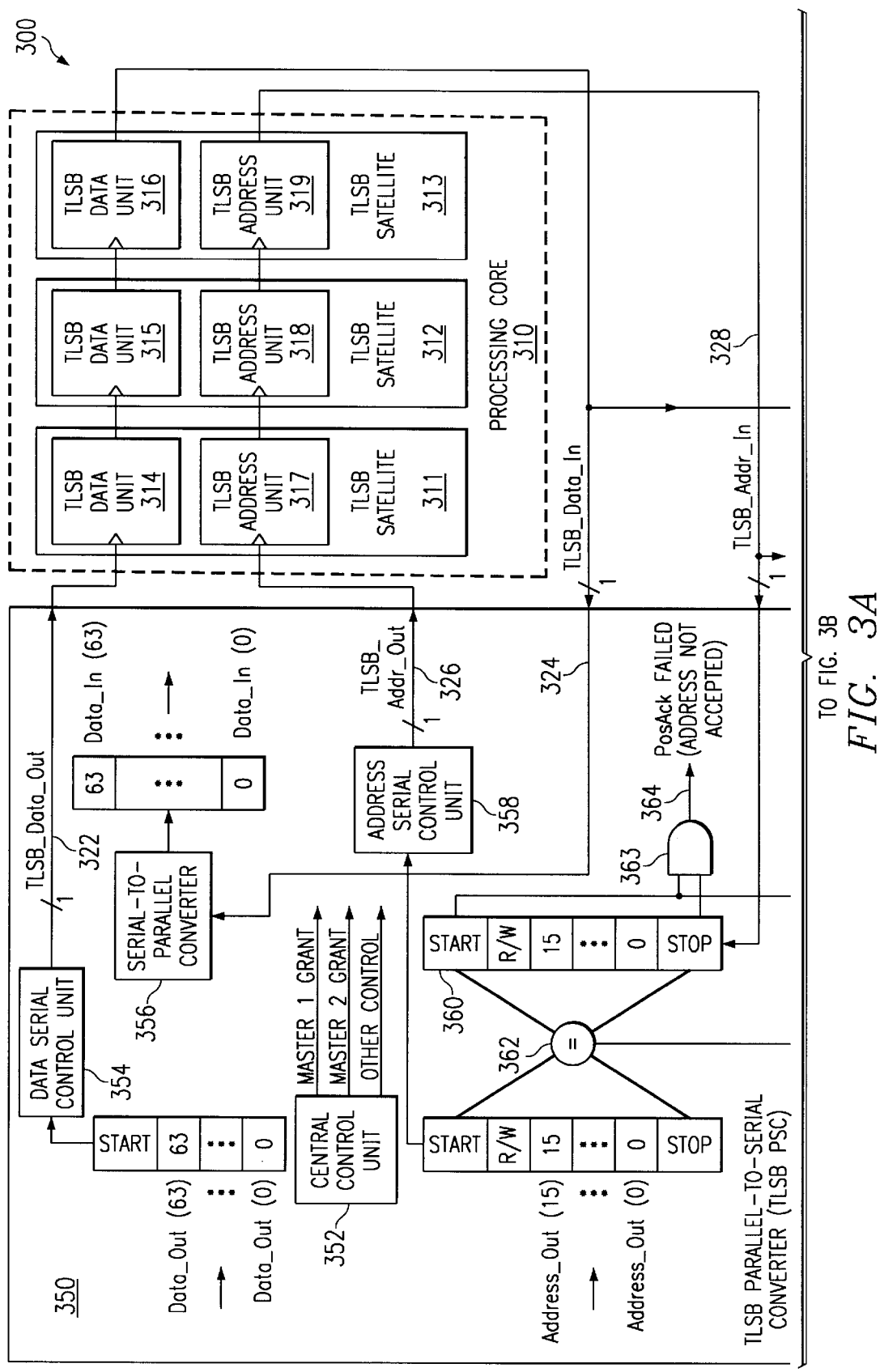
FIG. 3 is a block diagram depicting the layout of a two-wire serial bus and various control units that provide the functionality of a positive acknowledgment in accordance with a preferred embodiment of the present invention.
Figure 3B:
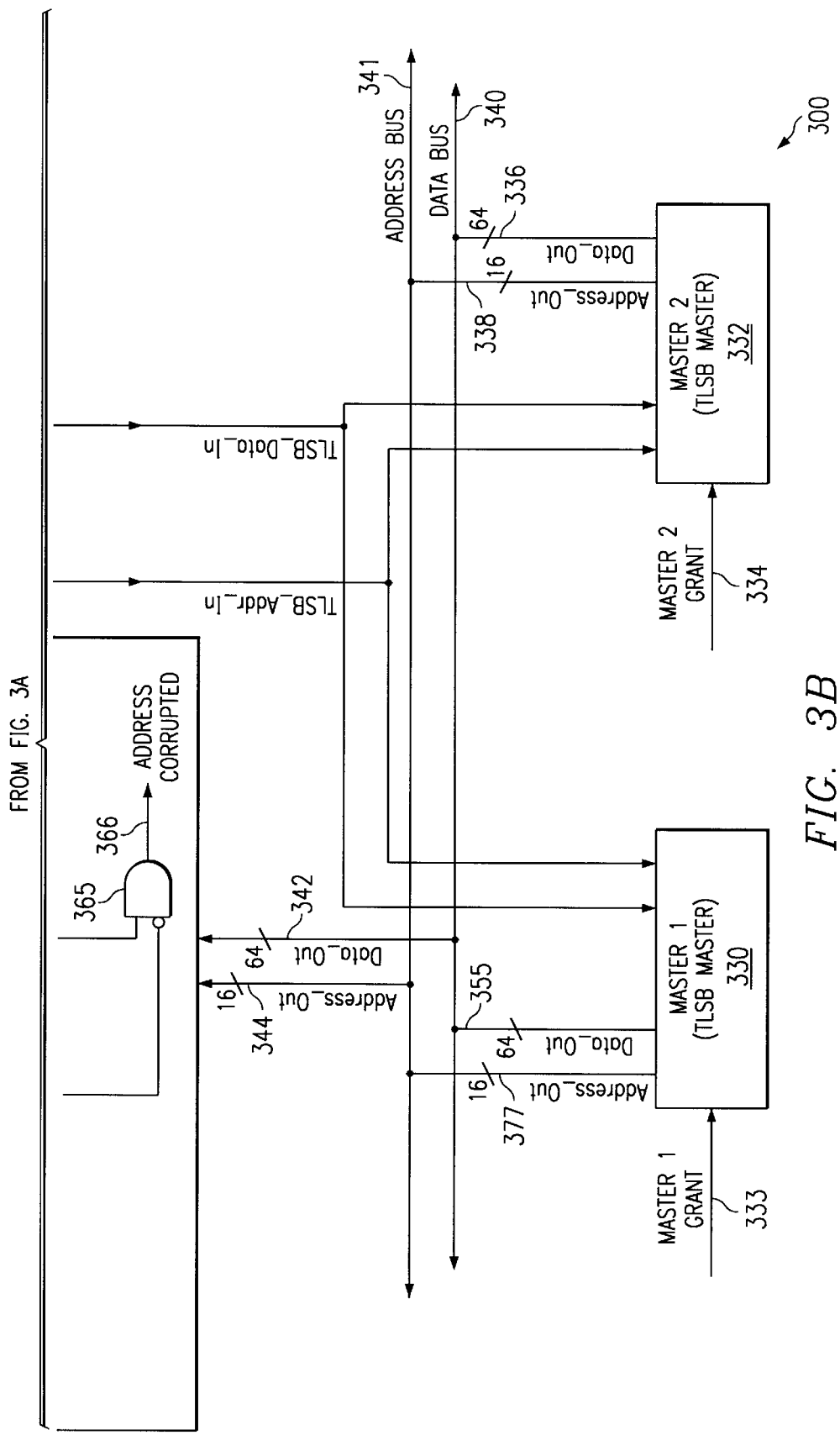

It is certified that error appears in the above-identified patent and that said Letters Patent is hereby corrected as shown below:

Column 2,
Line 45, delete "FIG. 3 is a block diagram" and insert -- FIGS. 3A-3B are block diagrams --.

Column 4,
Line 4, after "to", delete "FIG. 3, a block diagram depicts" and insert -- FIGS. 3A-3B, block diagrams depict --.
Line 8, after "invention.", delete "FIG. 3 shows" and insert -- FIGS. 3A-3B show --.
Line 27, after "in", delete "FIG." and insert -- FIGS. --.
Line 28, delete "3," and insert -- 3A-3B, --.

Column 5,
Line 29, after "inputs" delete "Data Out" and insert -- Data_Out --.

Column 6,
Line 27, after "to", delete "FIG. 3" and insert -- FIGS. 3A-3B --.
Line 60, after "to", delete "FIG. 3," and insert -- FIGS. 3A-3B, --.

Column 7,
Lines 8 and 10, after "in", delete "FIG. 3," and insert -- FIGS. 3A-3B, --.
Line 44, after "in", delete "FIG. 3." and insert -- FIGS. 3A-3B. --.

Column 8,
Line 20, after "to" delete "FIG. 3," and insert -- FIGS. 3A-3B, --.

Signed and Sealed this

Sixteenth Day of December, 2003

JAMES E. ROGAN
*Director of the United States Patent and Trademark Office*